United States Patent [19]

Hayakawa

[11] Patent Number: 4,506,561

[45] Date of Patent: Mar. 26, 1985

[54] TRANSMISSION HOUSING

[75] Inventor: Yoshikazu Hayakawa, Yokosuka, Japan

[73] Assignee: Nissan Motor Company, Limited, Yokohama, Japan

[21] Appl. No.: 328,016

[22] Filed: Dec. 7, 1981

[30] Foreign Application Priority Data

Dec. 11, 1980 [JP] Japan .................. 55-76709[U]

[51] Int. Cl.³ .................. F16H 57/02; B23Q 7/00; B65D 8/10; F16D 1/00
[52] U.S. Cl. .................. 74/606 R; 29/525; 220/73; 403/337; 285/422
[58] Field of Search .................. 74/606 R; 29/525; 220/73, 71; 228/263.16; 219/121 ED; 192/112; 248/559; 403/335, 337, 338; 285/49, 422, DIG. 24

[56] References Cited

U.S. PATENT DOCUMENTS

| | | | |
|---|---|---|---|
| 2,764,136 | 9/1956 | Gadd | 220/73 X |
| 3,263,521 | 8/1966 | Müller | 74/606 R |
| 3,581,814 | 6/1971 | Jackson | 220/73 X |
| 3,622,037 | 11/1971 | Gildart | 220/73 |
| 3,745,854 | 7/1973 | Haag et al. | 74/606 R |
| 3,942,502 | 3/1976 | Gorres et al. | 74/606 R X |
| 4,344,543 | 8/1982 | Hoffman | 220/71 X |
| 4,380,301 | 4/1983 | Eisman | 220/73 |

FOREIGN PATENT DOCUMENTS

| | | | |
|---|---|---|---|
| 1845 | 1/1982 | Japan | 74/606 R |
| 701979 | 1/1954 | United Kingdom | 74/606 R |
| 926206 | 5/1963 | United Kingdom | 74/606 R |

Primary Examiner—Allan D. Herrmann
Assistant Examiner—Stephen B. Andrews
Attorney, Agent, or Firm—Schwartz, Jeffery, Schwaab, Mack, Blumenthal & Koch

[57] ABSTRACT

A transmission housing for an automotive vehicle, comprises a bell housing made of light alloy and connected at its front end section to an engine block, and a lip supporting member made of steel and securely attached to bell housing front end section, along the periphery thereof, thereby preventing the bell housing from vibratingly deforming in its radial direction so as to reduce noise radiated therefrom.

4 Claims, 7 Drawing Figures

TRANSMISSION HOUSING

BACKGROUND OF THE INVENTION

1. Field of the Invention

This invention relates in general to a transmission housing of an automotive vehicle, and more particularly to an improvement in the transmission housing to reduce noise radiated therefrom.

2. Description of the Prior Art

In connection with housings of automotive vehicle transmissions, it is well known that the transmission housings are produced by casting using a light alloy such as an aluminum alloy for the purpose of reducing engine weight. However, such a light alloy-made transmission housing tends to vibratingly deform in its radial direction due to the flexural vibration of a transmission line during vehicle cruising. The deformation of the transmission housing causes high level noises to be radiated to ambient air, thereby increasing total vehicle noise.

BRIEF SUMMARY OF THE INVENTION

In accordance with the present invention, a transmission housing comprises a bell housing made of a light alloy and secured at its front end section to an engine block. A lip supporting member made of steel is securely attached to the front end section of said bell housing and located along the periphery of the the bell housing front end section. With this arrangement, the bell housing can be effectively prevented from deforming in its radial direction, thereby reducing noise to be radiated therefrom.

BRIEF DESCRIPTION OF THE DRAWINGS

The features and advantages of the transmission housing according to the present invention will be more clearly appreciated from the following description taken in conjunction with the accompanying drawings in which like reference numerals designate the corresponding parts and elements, and in which.

DETAILED DESCRIPTION OF THE INVENTION

Figure 1:
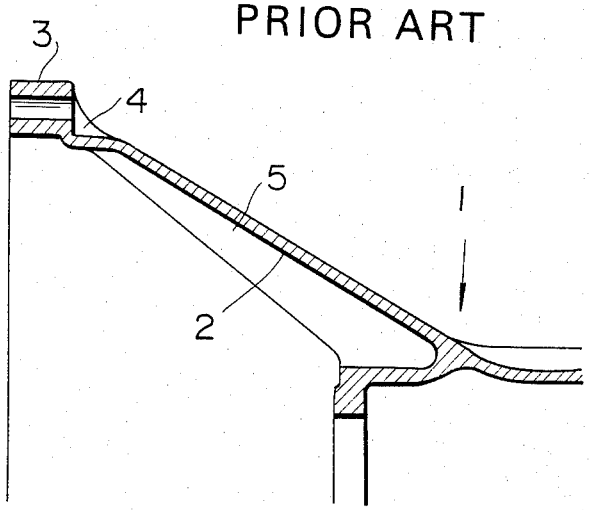
FIG. 1 is a fragmentary cross-sectional view of a conventional transmission housing.

To facilitate understanding the present invention, a brief reference will be made to a conventional transmission housing 1, depicted in FIGS. 1 to 3. Referring to FIG. 1, the transmission housing 1 is cast and made of a light alloy such as an aluminum alloy. The transmission housing 1 includes a bell housing 2 having an attachment flange 3 through which the bell housing 2 is securely connected to an engine block (not shown). The bell housing 2 is integrally formed with reinforcement ribs 4, 5 which are located in the axial direction thereof. Accordingly, the rigidity of the connection of the transmission housing 1 with the engine block is increased by the reinforcement ribs 4, 5, so that the reinforcement ribs 4, 5 contribute to preventing generation of noise caused by vibration of the wall surface of the bell housing 2. In the case of an automotive vehicle of front-engine and rear-drive type wherein an engine power output shaft is usually located under the engine block, a transmission is also located under the engine block and therefore the wall surface of the bell housing 3 tends to readily vibrate.

Figure 2:
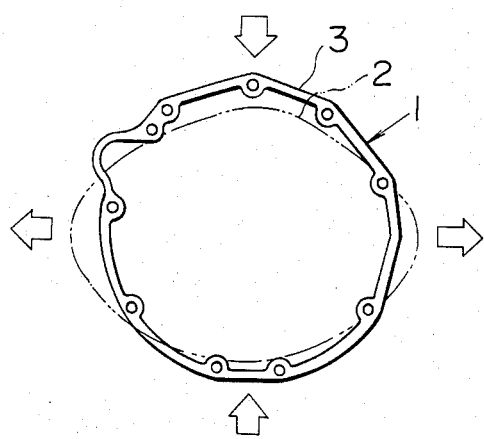
FIGS. 2 and 3 are illustrations showing the noise creation mechanism of the conventional transmission housing of FIG. 1.
Figure 3:
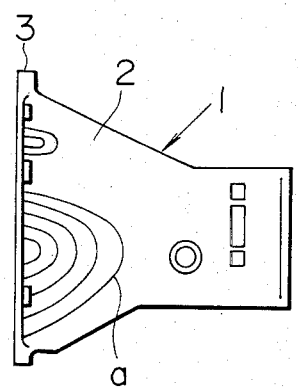

With an automotive transmission provided with such a conventional transmission housing, the bell housing is usually integrally formed by aluminium alloy casting, and accordingly the bell housing 2 vibratingly deforms radially or in the directions of the arrows shown in FIG. 2 to take the form shown in phantom though the attachment flange 3 is thick and the reinforcement rib 4 is formed along the longitudinal axis of the bell housing 2. This causes vibrations at the surface of the bell housing 2 as indicated by the character "a" in FIG. 3 which vibrations have their highest amplitude at locations near the bell housing front end or the attachment flange 3, thereby creating relatively high-level noise to be radiated to ambient air.

Figure 4:
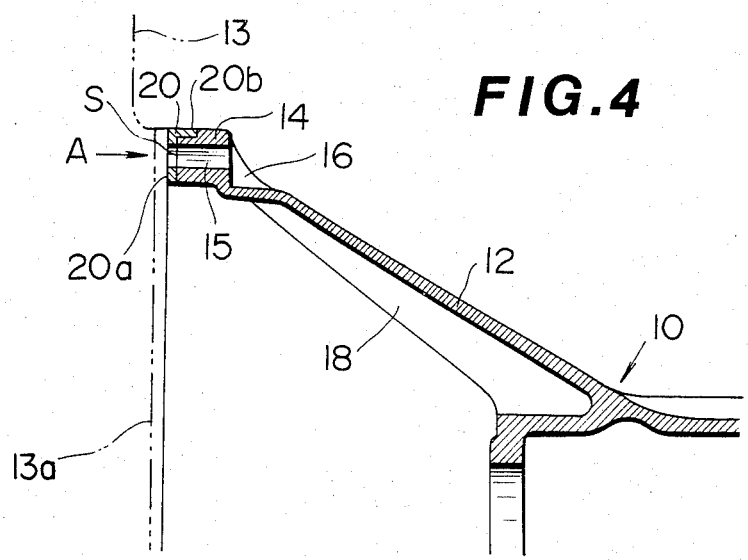
FIG. 4 is a fragmentary cross-sectional view of a preferred embodiment of a transmission housing in accordance with the present invention.
Figure 5:
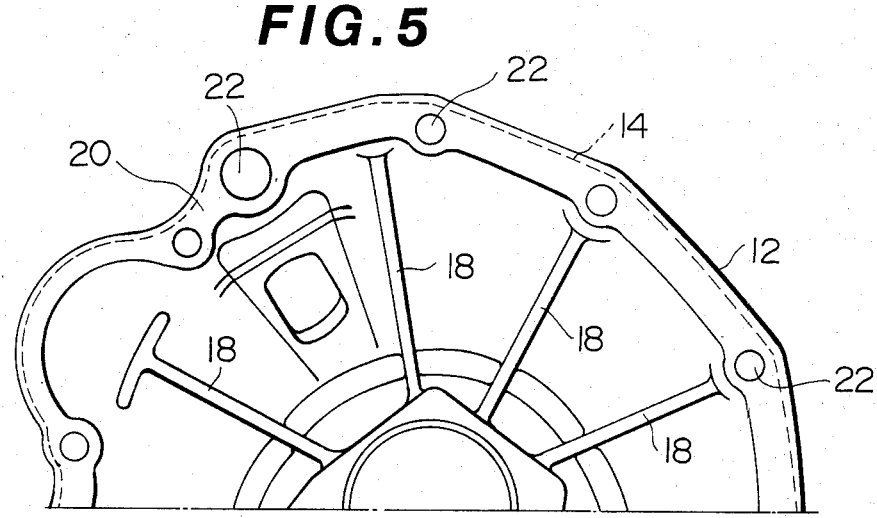
FIG. 5 is a fragmentary side elevational view taken in the direction of an arrow A.

In view of the above description of the conventional transmission housing, reference is now made to FIGS. 4 and 5, wherein a preferred embodiment of a transmission housing of the present invention is illustrated by the reference numeral 10. The transmission housing 10 encloses therein a transmission mechanism (not shown) as customary, and comprises a bell housing 12 enclosing a flywheel and clutch or torque converter. The bell housing 12 is integrally formed in one-piece by casting and made of a light alloy such as an aluminum alloy. The other portions of the transmission housing 10 may be also made of a light alloy similar to the bell housing 12. The bell housing 12 is formed integrally at its front end section with a generally annular attachment flange 14 through which the bell housing 12 is securely connected to an engine block (13) through an end plate (13a). The flange 14 is formed with a plurality of holes for connection with the engine block. The bell housing 12 is further integrally formed with a plurality of reinforcement ribs 16 and 18 which are located outside and inside of the bell housing 12.

A generally annular lip supporting member 20 made of steel is securely attached to the generally annular flat surface S of the front end section of the attachment flange 14. The lip supporting member 20 has a generally annular flat section 20a contacting the flange front end flat surface S, and a generally cylindrical section 20b which is perpendicular to the flat section 20a and embedded in the outer peripheral section of the bell housing flange 14. In other words, the lip supporting member 20 is L-shaped in section, i.e. in the shape wherein the lip supporting member 20 is bent at right angles at its outer peripheral section. This can improve locating of the lip supporting member 20 in position during casting and provide an improved rigidity of the bell housing front end section. It will be understood that the flat section 20a of the lip supporting member 20 is suitably formed with though-holes 22 for connection with the engine block and for locating thereof relative to the bell housing flange 14, as clearly shown in FIG. 5.

With the thus arranged converter housing 10, the bell housing 12 is provided at its front end section with the steel-made lip supporting member which is much higher in rigidity than the aluminum alloy constituting the bell housing body, and the lip supporting member 20 is embedded generally annularly in the bell housing flange 14. Therefore, the bell housing 12 is increased in rigidity in the radial direction of the bell housing front end section, thereby greatly lowering vibrations created at the surface of the bell housing 12.

Figure 6:
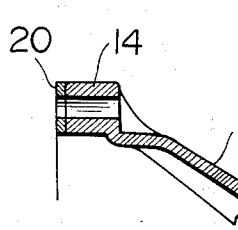
FIG. 6 is a fragmentary cross-sectional view showing the essential part of another embodiment of the transmission housing according to the present invention.

FIG. 6 shows another embodiment of the transmission housing, in which the lip supporting member 20 is merely flat and has no generally cylindrical section (20b in FIG. 4). Although this example of the lip supporting member is slightly inferior in effect as compared with in the embodiment of FIG. 4, the productivity thereof is excellent.

Figure 7:
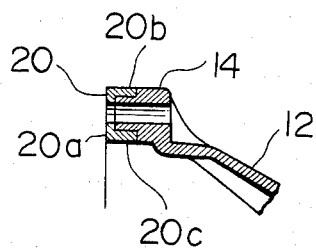
FIG. 7 is a fragmentary cross-sectional view showing the essential part of a further embodiment of the transmission housing according to the present invention.

FIG. 7 shows a further embodiment of the transmission housing, in which the lip supporting member 20 is generally C-shaped and accordingly includes an additional generally cylindrical section 20c on the embodiment of FIG. 4. The cylindrical section 20c is formed perpendicular to the flat section 20a and embedded in the inner peripheral section of the bell housing flange 14. It will be understood that this example of the lip supporting member 20 is excellent in effect as compared with the example of FIG. 4.

As appreciated from the above, according to the present invention, the bell housing of a transmission is provided at its front end section with a steel-made lip supporting member in order to effectively suppress vibration created at the surface of the bell housing which vibration has its highest amplitude at locations near the bell housing front end section constituting a major noise source of the bell housing. As a result, the vibration at the bell housing surface can be in fact greatly decreased, thereby effectively lowering the noise level of the transmission. Furthermore, by virtue of employing the lip supporting member, it becomes unnecessary to form the bell housing flange thick for obtaining rigidity in the radial direction thereof, thereby eliminating the drawback caused by a thick wall construction of the bell housing flange, e.g. shrinkage of the bell housing flange during casting of the bell housing.

What is claimed is:

1. A transmission housing, comprising:
   a bell housing made of a first material comprising a light alloy said bell housing having a front end section connected to an engine block, said bell housing being formed at said front end section with a generally annular attachment flange through which said bell housing is connected to said engine block, said attachment flange defining thereinside a bell mouth; and
   a lip supporting member made of a second material which is higher in rigidity than said first material and comprises steel, said lip supporting member being securely attached to said bell housing front end section, said lip supporting member being located along the periphery of the bell housing front end section, said attachment flange having a generally annular flat surface and said lip supporting member being generally annular and fastened on said generally annular flat surface of said attachment flange.

2. A transmission housing as claimed in claim 1, wherein said lip supporting member includes a generally annular flat section contacted to the generally annular flat surface of said attachment flange.

3. A transmission housing as claimed in claim 2, wherein said lip supporting member further includes a first generally cylindrical section which is integral with and perpendicular to said flat section of said lip supporting member, said first generally cylindrical section being embedded in the outer peripheral section of said attachment flange.

4. A transmission housing as claimed in claim 3, wherein said lip supporting member further includes a second generally cylindrical section which is integral with and perpendicular to said flat section of said lip supporting member, said second generally cylindrical section being embedded in the inner peripheral section of said attachment flange.

* * * * *

UNITED STATES PATENT AND TRADEMARK OFFICE
CERTIFICATE OF CORRECTION

PATENT NO. : 4,506,561
DATED : March 26, 1985
INVENTOR(S) : Yoshikazu HAYAKAWA

It is certified that error appears in the above—identified patent and that said Letters Patent is hereby corrected as shown below:

On the title page;

At item [30] Foreign Application Priority Data should read -- Japan 55-176709[U] -- instead of "55-76709[U].

Signed and Sealed this

Sixteenth Day of July 1985

[SEAL]

Attest:

DONALD J. QUIGG

Attesting Officer  Acting Commissioner of Patents and Trademarks